(12) United States Patent
Moriguchi et al.

(10) Patent No.: US 6,194,681 B1
(45) Date of Patent: Feb. 27, 2001

(54) POWER SUPPLY APPARATUS FOR ARC-UTILIZING MACHINE

(75) Inventors: Haruo Moriguchi, Itami; Tetsuro Ikeda, Osaka; Kenzo Danjou, Kyoto-fu; Atsushi Kinoshita, Osaka, all of (JP)

(73) Assignee: Sansha Electric Manufacturing Company Limited, Osaka (JP)

( * ) Notice: Subject to any disclaimer, the term of this patent is extended or adjusted under 35 U.S.C. 154(b) by 0 days.

(21) Appl. No.: 09/498,077

(22) Filed: Feb. 4, 2000

(51) Int. Cl.[7] .................................................. B23K 10/00
(52) U.S. Cl. ........................ 219/121.54; 219/121.57; 219/130.32; 219/130.4; 219/121.39
(58) Field of Search ...................... 219/121.48, 121.54, 219/121.57, 121.59, 121.39, 121.45, 130.32, 130.4

(56) References Cited

U.S. PATENT DOCUMENTS

| | | | |
|---|---|---|---|
| 5,630,952 | * | 5/1997 | Karino et al. .................. 219/121.54 |
| 5,864,110 | * | 1/1999 | Moriguchi et al. ............. 219/121.57 |

FOREIGN PATENT DOCUMENTS 63-212071  10/1988  (JP).

\* cited by examiner

*Primary Examiner*—Mark Paschall
(74) *Attorney, Agent, or Firm*—Duane, Morris & Heckscher LLP

(57) ABSTRACT

A DC voltage resulting from rectifying and smoothing a commercial AC voltage is converted into a high-frequency voltage in an inverter which is operated in response to the closure of a start switch. A transformer transforms the high-frequency voltage, and the voltage-transformed high-frequency voltage is converted to a DC voltage by a rectifier and reactor for application between a torch and a workpiece with a gap disposed therebetween. In response to the closure of the start switch, an igniter operated from the voltage-transformed high-frequency voltage is enabled by an igniter driver to thereby apply a high-frequency voltage between the torch and the workpiece to generate an arc therebetween. A current detector detects current attributable to the arcing. A timer starts operating upon closure of the start switch and causes a disabling commander to disable the inverter when no current is detected by the current detector during a time period longer than a period required for an arc to be generated in the gap. This interrupts the supply of the operating voltage for the igniter, and the igniter stops operating.

4 Claims, 2 Drawing Sheets

POWER SUPPLY APPARATUS FOR ARC-UTILIZING MACHINE

This invention relates to a power supply apparatus for a machine, e.g. a non-consumable electrode arc welder or a non-consumable electrode arc cutter, in which an arc is generated between a non-consumable electrode and a workpiece for processing the workpiece with the arc.

BACKGROUND OF THE INVENTION

A non-consumable electrode arc welder or cutter has a gap between its non-consumable electrode and a workpiece to be processed. A high-frequency voltage is applied between the electrode and the workpiece to cause breakdown of the insulation between them so that an arc is generated. Some such machines are arranged to maintain the arcing by applying a DC voltage between the electrode and the workpiece, which form a load.

An example of such non-consumable electrode welders is disclosed in Japanese Unexamined Patent Publication (KOKAI) No. SHO 63-212071 A published on Sep. 5, 1988. The non-consumable electrode arc welder disclosed in this publication converts a commercial AC voltage into a DC voltage, which, in turn, is converted to a high-frequency voltage in an inverter. The high-frequency voltage is applied to a primary winding of a transformer so that a voltage-transformed high-frequency voltage is induced in a secondary winding. The high-frequency voltage induced in the secondary winding is converted back into a DC voltage, which is applied between a non-consumable electrode of the welder and a workpiece. A high-frequency ignition voltage generator applies a high-frequency ignition voltage between the electrode and the workpiece to initiate an arc between them. The arc is to be sustained by the DC voltage.

A current detector detects load current flowing through the electrode and the workpiece, and an inverter control unit controls the inverter in such a manner as to make the detected load current have a predetermined magnitude. The high-frequency ignition voltage generator is driven with the high-frequency voltage induced in the secondary winding of the transformer. The high-frequency ignition voltage generator is disabled when the current detector detects the load-current.

In some cases where the gap between a non-consumable electrode and a workpiece is large, a high-frequency voltage from a high-frequency ignition voltage generator may not be able to cause breakdown between the electrode and the workpiece. Then, no arcing occurs, and, therefore, the high-voltage generator keeps on generating the high-frequency voltage. The high-frequency voltage generates undesirable electromagnetic waves, which could interfere with the operation of other apparatuses around the arc welder.

An object of the present invention is to provide a power supply apparatus for arc-utilizing machines, having a high-frequency ignition voltage generator which can be immediately disabled when arcing cannot be established between a non-consumable electrode and a workpiece.

This and other objects of the present invention will be understood from the following detailed description of this invention.

SUMMARY OF THE INVENTION

A power supply apparatus for arc-utilizing machines according to the present invention includes high-frequency switching means for switching a DC signal from a DC signal source to develop a first high-frequency signal. The DC signal source may be, for example, an AC-to-DC converter which converts a commercial AC signal into a DC signal. The high-frequency switching means may be, for example, an inverter or a chopper. The first high-frequency signal from the high-frequency switching means is applied to a primary winding of a transformer, which also includes a secondary winding. A second high-frequency signal is induced in the secondary winding of the transformer and is converted into a DC signal in a converter. The DC signal from the converter is applied between two output terminals, which are to be connected to a non-consumable electrode of an arc-utilizing machine and a workpiece to be processed by the arc-utilizing machine. A high-frequency ignition voltage generator generates and applies a third high-frequency signal between the two output terminals. A current detector detects load current supplied to the non-consumable electrode and workpiece and generates a load-current-representative signal representing the detected load current. The load-current-representative signal is applied to high-frequency switching means control means, which controls, when an enabling signal is provided from an enabling signal generator, the high-frequency switching means so as to make the load-current-representative signal have a predetermined value. The enabling signal is also applied to high-frequency ignition voltage generator control means for controlling the high-frequency ignition voltage generator. When the enabling signal is applied to the high-frequency ignition voltage generator control means, it causes the high-frequency ignition voltage generator to start operating and keeps it operating until the load-current-representative signal is generated. If no load-current-representative signal is generated during a predetermined time period following the generation of the enabling signal by the enabling signal generator, disabling means stops the operation of the high-frequency ignition voltage generator.

The disabling means may include a timer which is enabled by the enabling signal from the enabling signal generator to generate an expiration signal when the predetermined time period has lapsed. This timer is reset when the load-current-representative signal is generated during the predetermined time-measuring period. In this case, the high-frequency ignition voltage generator may be arranged to receive the second high-frequency signal induced in the secondary winding of the transformer, and the disabling means is provided with stopping means for stopping the operation of the high-frequency switching means control means when the timer develops the expiration signal.

The disabling means may be arranged to disable the high-frequency ignition voltage generator control means.

DETAILED DESCRIPTION OF PREFERRED EMBODIMENTS

Figure 1:
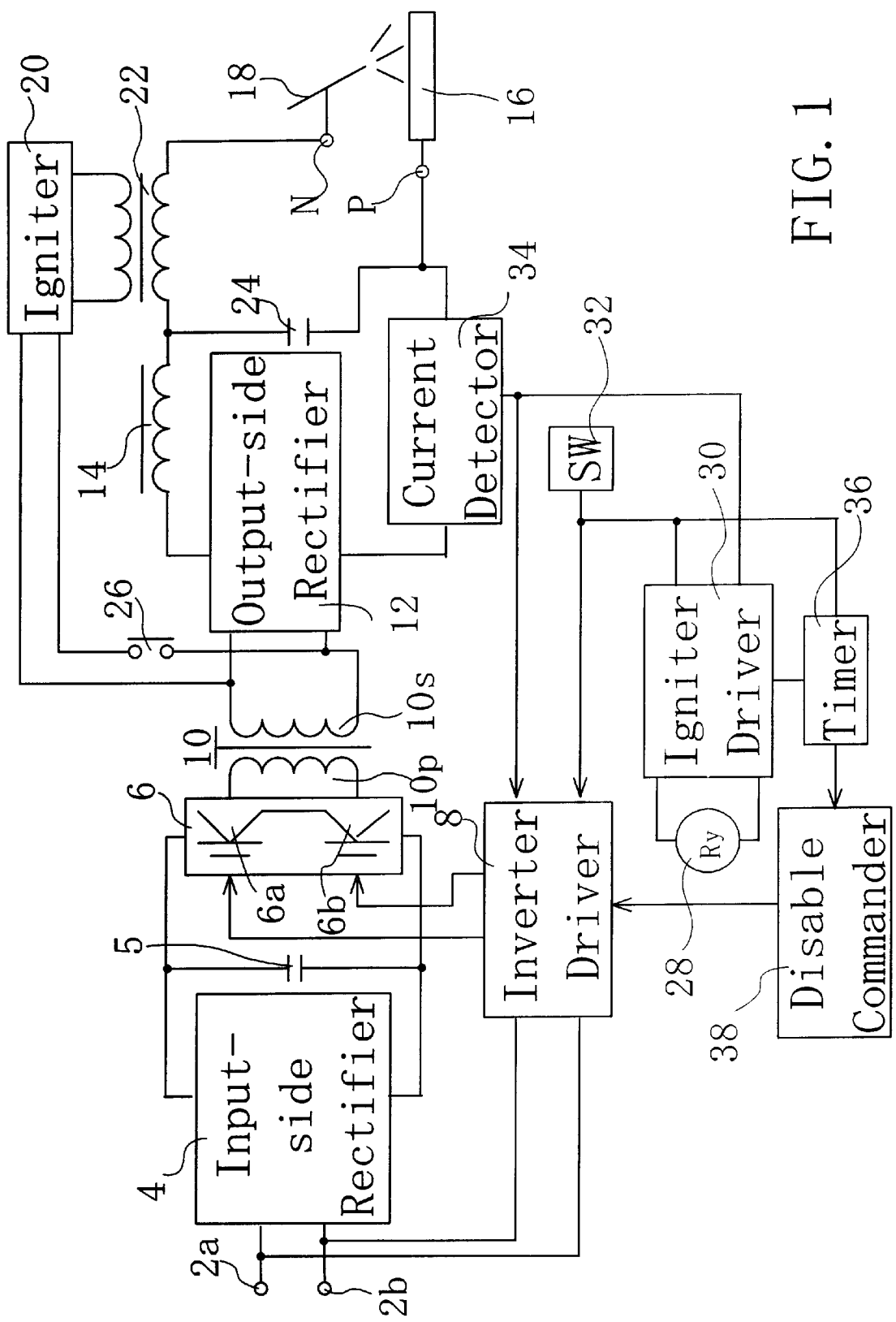
FIG. 1 is a block diagram of an arc welder with a power supply apparatus according to a first embodiment of the present invention.

An arc welder with a power supply apparatus according to a first embodiment of the present invention is shown in FIG.

1. The power supply apparatus includes power supply terminals 2a and 2b between which a commercial AC power supply voltage, e.g. a single-phase commercial AC voltage, is supplied. The commercial AC voltage applied between the terminals 2a and 2b is rectified in an input-side rectifier 4. The rectifier 4 may include a full-wave rectifier circuit or a half-wave rectifier circuit formed of, for example, rectifying diodes. An output signal from the input-side rectifier 4 is smoothed in a smoothing capacitor 5. The rectifier 4 and the smoothing capacitor 5 form a DC power source. Instead, a battery may be used as the DC power source.

A DC voltage produced in the DC power source is applied to high-frequency switching means 6, e.g. a high-frequency inverter, where it is converted into a high-frequency voltage. The high-frequency inverter 6 may be of half-bridge type and include two IGBTs 6a and 6b, which are alternately switched at a high frequency by a drive signal supplied by inverter control means 8, e.g. an inverter driver. The inverter driver 8 is driven by the commercial AC voltage as applied to the power supply terminals 2a and 2b. In place of the high-frequency inverter 6, a chopper circuit may be used.

A high-frequency voltage from the high-frequency inverter 6 is applied to a primary winding 10p of a transformer 10, e.g. voltage transformer. A voltage-transformed high-frequency voltage is induced in a secondary winding 10s of the transformer 10.

The voltage-transformed high-frequency voltage is rectified in an output-side rectifier 12, which may be a full-wave or half-wave rectifier circuit, formed of, e.g. rectifying diodes. An output voltage from the output-side rectifier 12 is smoothed in a smoothing reactor 14. The output-side rectifier 12 and the smoothing reactor 14 form a converter for converting the high-frequency voltage into a DC voltage.

The output DC voltage from the converter is applied between output terminals P and N. The output terminal P is connected to a workpiece 16 to be processed by the arc welder, and the output terminal N is connected to a non-consumable electrode 18, e.g. a torch. A gap is disposed between the torch 18 and the workpiece 16. Although not shown, an inert gas from an inert gas source is directed from the torch 18 toward the workpiece 16 during operation.

A high-frequency ignition voltage generator 20, e.g. an igniter, is used to generate an arc between the torch 18 and the workpiece 16. The igniter 20 receives the high-frequency voltage induced in the secondary winding 10s of the transformer 10, and operates to generate a high-frequency ignition voltage while the high-frequency voltage from the transformer secondary winding (hereinafter referred to as transformer high-frequency voltage) is being applied to it. The high-frequency ignition voltage generated in the igniter 20 is applied between the torch 18 and the workpiece 16 through a coupling coil 22 and a capacitor 24. The coupling coil 22 is coupled between the reactor 14 and the output terminal N, and the capacitor 24 is coupled between the reactor 14 and the output terminal P. The igniter 20 can be of a known configuration, and, therefore, no detailed description is given herein.

Application and removal of the transformer high-frequency voltage to and from the igniter 20 is achieved by closing and opening switching means 26, e.g. a relay contact, connected between the secondary winding 10s of the transformer 10 and the igniter 20. The relay contact 26 is closed and opened by energizing and deenergizing a relay driving coil 28. The relay driving coil 28 is connected to an igniter driver 30.

When an enabling signal generator 32, e.g. a start switch, is operated or closed, it generates an enabling signal. The enabling signal is applied to the igniter driver 30, which energizes the relay driving coil 28 when some time period from the application of the enabling signal to the igniter driver 30 has lapsed. This time period is a period required for the inert gas source to start supplying the inert gas.

The start switch 32 is disposed on, for example, the torch 18.

The enabling signal from the switch 32 is also applied to the inverter driver 8 to cause it to start operating.

The igniter driver 30 deenergizes the relay driving coil 28 in response to a load-current-representative signal provided by a current detector 34 connected between the output-side rectifier 12 and the output terminal P. The current detector 34 detects the flow of load current caused by the arcing and generates the load-current-representative signal representing the load current it detects. The igniter driver 30, the relay driving coil 28 and the relay contact 26 form high-frequency ignition voltage generator control means.

The load-current-representative signal from the current detector 34 is also applied to the inverter driver 8, which controls the conduction period of the IGBTs 6a and 6b in such a manner that the current-representative signal can have a predetermined value.

The enabling signal generated when the start switch 32 is closed is applied also to a timer 36. When the enabling signal is applied to the timer 36, the timer 36 develops an expiration signal when a preset time period expires. The preset time period may be slightly longer than a time period thought to be required for an arc to be generated between the torch 18 and the workpiece 16 after the start switch 32 is closed. If the current detector 34 detects the generation of an arc before the end of the preset time period, the igniter driver 30 produces a reset signal, which resets the timer 36.

The expiration signal developed by the timer 36 is applied to a disabling commander 38, causing the operation of the inverter driver 8 to be stopped, which results in the disabling of the inverter 6. The timer 36 and the disabling commander 38 provide disabling means.

With the above-described arrangement, when the start switch 32 is closed, the inverter driver 8 starts operating to enable the inverter 6. Then, the transformer high-frequency voltage is induced in the secondary winding 10s of the transformer 10, and the induced transformer high-frequency voltage is rectified in the output-side rectifier 12 and smoothed in the smoothing reactor 14. The smoothed voltage is applied between the torch 18 and the workpiece 16 via the output terminals N and P. Arcing, however, does not occur since there is a gap between the torch 18 and the workpiece 16.

On closing the start switch 32, the relay driving coil 28 is energized by the igniter driver 30 to close the relay contact 26, resulting in the enabling of the igniter 20. This causes the high-frequency ignition voltage to be applied across the gap between the torch 18 and the workpiece 16. The ignition voltage breaks down the insulation provided by the gap and, therefore, causes an arc to be generated between the torch 18 and the workpiece 16. The load current flowing due to the initiation of the arcing is detected by the current detector 34, which provides the load-current-representative signal representing the detected current to the inverter driver 8. The inverter driver 8 provides such a control for the inverter 6 as to sustain the arc and to maintain the load current constant. The generation of the arc causes the igniter driver 30 to deenergize the relay driving coil 28 so as to open the relay contact 26 for disabling the igniter 20. At the same time, the igniter driver 30 resets the timer 36, which has been operating since it was enabled by the closure of the start switch 32. Accordingly, no expiration signal is developed, and, therefore, the disabling commander 38 is not enabled.

If the gap between the torch 18 and the workpiece 16 is too large for an arc to be generated by the high-frequency ignition voltage provided by the igniter 20, the timer 36 provides the expiration signal to the disabling commander 38. Then, the disabling commander 38 provides the disabling signal to the inverter driver 8, which makes the inverter 6 stop operating. As the inverter 6 stops operating, the transformer high-frequency voltage is no longer generated in the secondary winding 10s of the transformer 10. Then, the igniter 20 stops generating the high-frequency ignition voltage.

In this manner, no undesirable electromagnetic waves based on the high-frequency ignition voltage are generated, so that faulty operation of machines around the arc welder, which could otherwise be caused by such electromagnetic waves, can be prevented. In this case, since the inverter 6 is also disabled, no electromagnetic waves based on the high-frequency voltage produced by the inverter 6 are generated.

Figure 2:
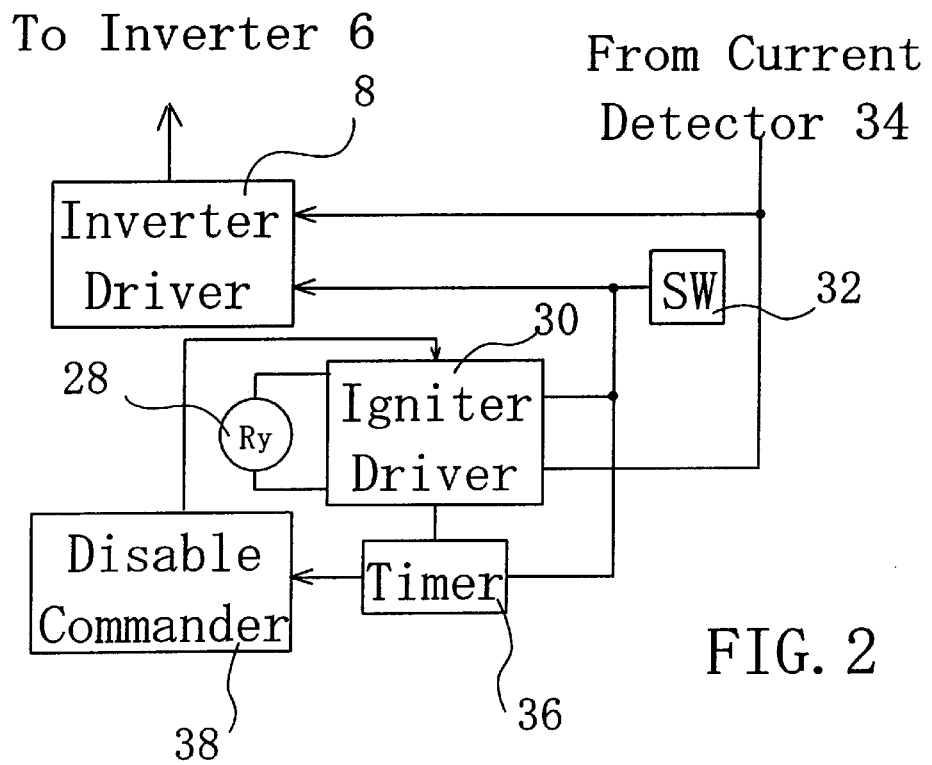
FIG. 2 is a block diagram of part of a power supply apparatus according to a second embodiment of the present invention.

As shown in FIG. 2, a power supply apparatus according to a second embodiment is arranged such that when the expiration signal is generated by the timer 36, a disabling commander 39 provides the disabling signal to the igniter driver 30, causing the igniter driver 30 to deenergize the relay driving coil 28. This causes the relay contact 26 to be opened, which results in the disabling of the igniter 20.

Since the remainder of the power supply apparatus according to the second invention is the same as the one shown in FIG. 1, no further detailed description is repeated.

Figure 3:
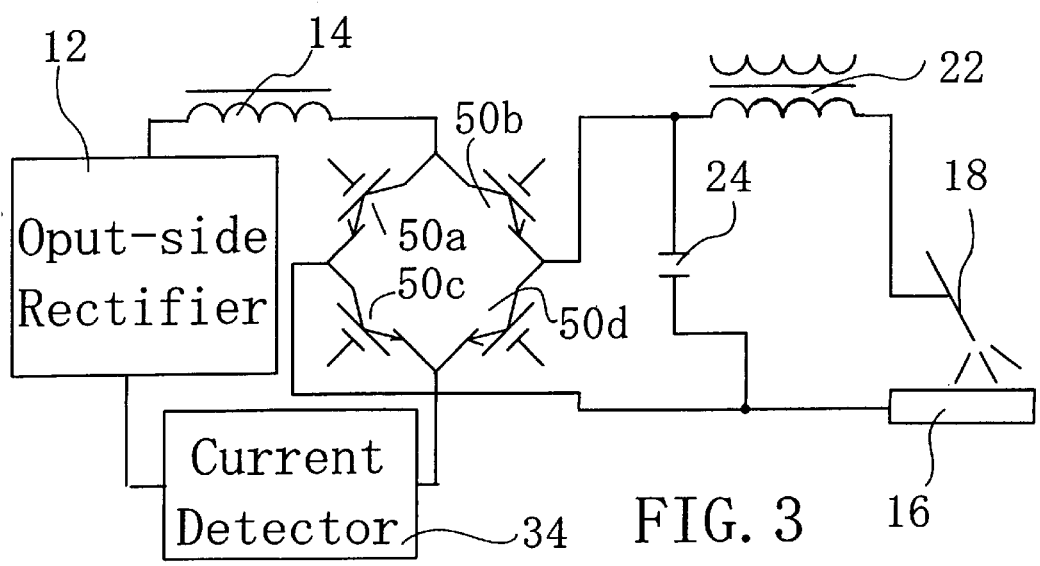
FIG. 3 is a block diagram of part of a power supply apparatus according to a third embodiment of the present invention.

According to a third embodiment of the present invention, a DC-to-AC converter 50 including, for example, switching devices connected in a full-bridge configuration is connected in the output of the output-side rectifier 12, as shown in FIG. 3. The switching devices may be IGBTs 50a, 50b, 50c and 50d. Pairs of IGBTs in the opposing branches, for example, the IGBTs 50a and 50d and the IGBTs 50b and 50c are alternately rendered conductive at a switching frequency of from 10 Hz to 200 Hz by a DC-to-AC converter control circuit (not shown) so as to apply a low-frequency AC voltage at 10–200 Hz between the torch 18 and the workpiece 16. The remainder of the power supply apparatus according to the third embodiment is the same as the one shown in FIG. 1. In place of IGBTs, bipolar transistors or FETs can be used as the switching devices.

The power supply apparatus according to the third embodiment is useful for, for example, welding aluminum.

What is claimed is:

1. A power supply apparatus for an arc-utilizing machine, comprising:

high-frequency switching means for high-frequency switching a DC signal supplied from a DC signal source into a first high-frequency signal;

a transformer having a primary winding and a secondary winding, said first high-frequency signal being supplied to said primary winding, a second high-frequency signal being induced in said secondary winding;

a converter for converting said second high-frequency signal into a DC signal;

two output terminals receiving said DC signal from said converter, said two output terminals being adapted to be coupled to a non-consumable electrode of the arc-utilizing machine and a workpiece, respectively;

a high-frequency ignition voltage generator for providing a third high-frequency signal between said two output terminals;

a current detector for detecting current flowing through said non-consumable electrode and workpiece and providing a current-representative signal representing the detected current;

an enabling signal generator for providing an enabling signal;

high-frequency switching means control means receiving said current-representative signal, said high-frequency switching means control means being responsive to said enabling signal for controlling said high-frequency switching means in such a manner as to maintain said current-representative signal at a predetermined value;

high-frequency ignition voltage generator control means for causing said high-frequency ignition voltage generator to start operating when said enabling signal is applied thereto and keeping said high-frequency ignition voltage generator operating until said current-representative signal is generated; and disabling means for disabling said high-frequency ignition voltage generator when no current-representative signal is generated during a predetermined time period after the generation of said enabling signal.

2. The power supply apparatus according to claim 1 wherein said disabling means comprises a timer which is enabled by said enabling signal and generate an expiration signal when said predetermined time expires, said timer being reset upon generation of said current-representative signal during said predetermined time period.

3. The power supply apparatus according to claim 2 wherein said high-frequency ignition voltage generator receives said second high-frequency signal induced in said secondary winding of said transformer, and said disabling means includes means for stopping the operation of said high-frequency switching means control means when said timer generates said expiration signal.

4. The power supply apparatus according to claim 2 wherein said disabling means disables said high-frequency ignition voltage generator control means when said timer generates said expiration signal.

* * * * *